(12) United States Patent
Hofmann et al.

(10) Patent No.: US 11,532,429 B2
(45) Date of Patent: Dec. 20, 2022

(54) DRY-TYPE TRANSFORMER

(71) Applicant: Siemens Energy Global GmbH & Co. KG, Munich (DE)

(72) Inventors: Bernd Hofmann, Kirchheim (DE); Benedikt Hönisch, Erlangen (DE); Tim-Felix Mai, Wendlingen (DE); Christian Seidel, Schwaig (DE); Steffen Weinert, Wangen (DE)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 1161 days.

(21) Appl. No.: 15/999,592

(22) PCT Filed: Feb. 9, 2017

(86) PCT No.: PCT/EP2017/052908
§ 371 (c)(1),
(2) Date: Aug. 17, 2018

(87) PCT Pub. No.: WO2017/140577
PCT Pub. Date: Aug. 24, 2017

(65) Prior Publication Data
US 2021/0210280 A1 Jul. 8, 2021

(30) Foreign Application Priority Data
Feb. 17, 2016 (DE) ...................... 10 2016 202 385.3

(51) Int. Cl.
*H01F 27/32* (2006.01)
*H01F 41/12* (2006.01)
*H01F 27/36* (2006.01)

(52) U.S. Cl.
CPC ......... *H01F 27/327* (2013.01); *H01F 27/363* (2020.08); *H01F 41/127* (2013.01); *H01F 2027/328* (2013.01); *H01F 2027/329* (2013.01)

(58) Field of Classification Search
CPC .... H01F 27/327; H01F 27/363; H01F 41/127; H01F 2027/328; H01F 2027/329;
(Continued)

(56) References Cited

U.S. PATENT DOCUMENTS 4,586,015 A * 4/1986 Takahara ............... H01F 27/363
336/69
6,445,269 B1 * 9/2002 Sylvain ................. H01F 41/127
336/84 R
(Continued)

FOREIGN PATENT DOCUMENTS

CA 898921 A 4/1972 ............. H01F 27/22
CN 1239581 A 12/1999 ............. H01F 27/32
(Continued)

OTHER PUBLICATIONS

Chinese Office Action, Application No. 201780011390.4, 9 pages, dated Jun. 3, 2020.
(Continued)

*Primary Examiner* — Tuyen T Nguyen
(74) *Attorney, Agent, or Firm* — Slayden Grubert Beard PLLC

(57) ABSTRACT

The present disclosure relates to electrical windings for a dry transformer which allows construction of a compact dry transformer even in relatively high voltage classes. For this purpose, the electrical winding has multiple windings of a winding conductor wound to form a coil. The coil has been embedded into a solid insulation body. In some embodiments, a coating of an electrically conductive material, comprising a resin matrix with at least 0.05% by weight of nanoscale filler, has been applied to at least one surface of the insulation body.

9 Claims, 1 Drawing Sheet

(58) Field of Classification Search
CPC ...... H01F 27/36; H01F 27/2885; H01F 27/28; H01F 27/32; H01F 41/12; C09D 5/24; C09D 7/68
See application file for complete search history.

(56) References Cited

U.S. PATENT DOCUMENTS

| | | | |
|---|---|---|---|
| 6,689,835 B2 | 2/2004 | Amarasekera et al. | 524/495 |
| 2011/0094777 A1 | 4/2011 | Swift et al. | 174/257 |

FOREIGN PATENT DOCUMENTS

| | | | | |
|---|---|---|---|---|
| CN | 2416585 Y | * | 1/2001 | |
| CN | 102054540 A | | 5/2011 | ........... C09D 201/00 |
| EP | 1133779 B1 | | 3/2005 | ............ H01F 27/32 |
| EP | 3144944 A1 | | 3/2017 | ............ H01F 27/28 |
| FR | 2784787 A1 | | 4/2000 | ............ H01F 27/08 |
| GB | 1156369 A | | 6/1969 | ............ H01F 27/32 |
| JP | 04-517230 | * | 8/2010 | |
| RU | 2107350 C1 | | 3/1998 | ............ H01F 27/36 |
| SU | 1645026 A1 | | 4/1991 | ............... B05D 1/38 |
| WO | 2012/152573 A1 | | 11/2012 | ............... C09D 5/24 |
| WO | 2017/140577 A1 | | 8/2017 | ............ H01F 27/28 |

OTHER PUBLICATIONS

Gost, R., "Dry Type Transformers—General Specifications, Part 11: Dry-Type Transformers" Federal Agency for Technical Regulation and Metrology, National Standard of the Russian Federation, 79 pages (Russian w/ English translation), Dec. 13, 2011.

Russian Office Action, Application No. 2018129873/07, 7 pages, dated Aug. 1, 2019.

German Office Action, Application No. 102016202385.3, 10 pages, dated Sep. 20, 2016.

International Search Report and Written Opinion, Application No. PCT/EP2017/052908, 23 pages, dated Apr. 19, 2017.

* cited by examiner

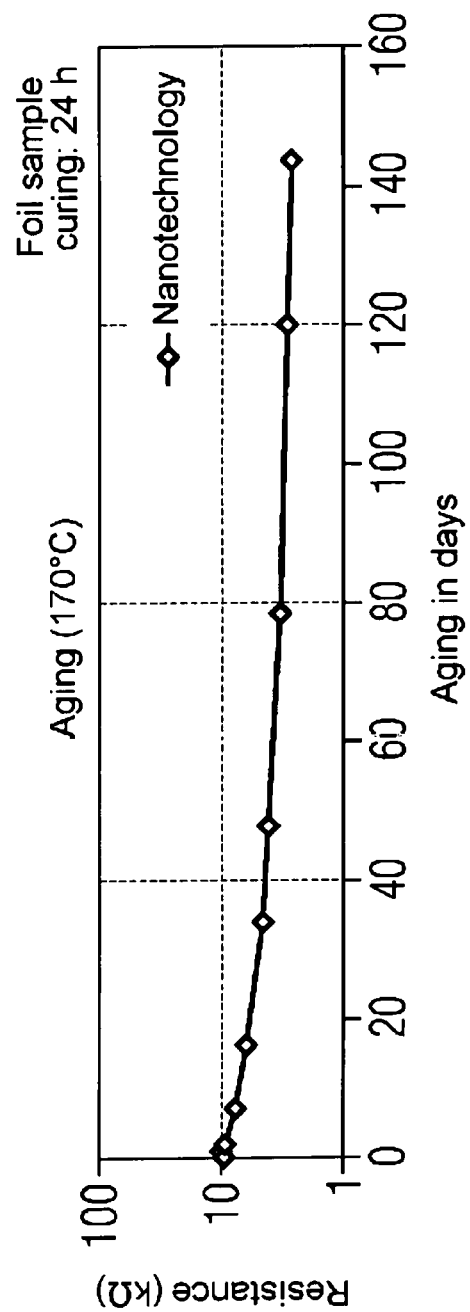

DRY-TYPE TRANSFORMER

CROSS-REFERENCE TO RELATED APPLICATIONS

This application is a U.S. National Stage Application of International Application No. PCT/EP2017/052908 filed Feb. 9, 2017, which designates the United States of America, and claims priority to DE Application No. 10 2016 202 385.3 filed Feb. 17, 2016, the contents of which are hereby incorporated by reference in their entirety.

TECHNICAL FIELD

The present disclosure relates to transformers. Various embodiments may include a coating for an insulation body of a dry transformer.

BACKGROUND

Dry transformers, especially cast resin transformers, are power transformers that are used in power engineering for transformation of voltages up to about 36 kV on the high-voltage side. In such transformers, a low-voltage winding and a high-voltage winding are arranged coaxially around a limb of a core. The low-voltage winding refers to that winding with the lower voltage, and the high-voltage winding to that with the higher voltage. Both windings have been embedded into a solid insulation material; in the case of the high-voltage winding, a casting resin is frequently used for the purpose.

The as yet unpublished EP 15185886 A1 discloses a development of the above-described dry transformer, especially for higher voltages than 36 kV. This discloses a more compact design of the dry transformer, the features of which include smaller dimensions of the dry transformer, i.e. a more compact design, and in this context also replacement of air as insulator by a suitable casting resin as solid insulation body. On the surface of the solid insulation body into which an electrical winding, i.e. more particularly a high- and/or low-voltage winding wound to the coil, has been embedded, a coating may be composed of a semiconductor material. Particular demands are made on the chemical and/or physical properties of this semiconductive coating, especially with regard to thermal, mechanical and chemical stability, as well as a defined sheet resistance.

Coatings in use at present comprise microscale filler particles, for example comprising conductive black, conductive graphite and/or coated mica particles. In general, these are highly filled systems with filler levels well above 10% by volume or 20% by weight and especially above 30% by weight. The particle size of the fillers here is customarily in the region of a few micrometers upward, and for that reason large amounts of filler content are necessary. The high filler levels of microscale filler particles make the coating considerably more expensive and also make it more difficult to process because the flowability of the formulations having a high filler level of microscale filler particles is not as good as those with less high a filler level. The use properties also deteriorate at high filler levels as a result of increasing embrittlement of the coating.

SUMMARY

A suitable formulation for a coating of the insulation body of a dry transformer will fulfill such a profile of properties, but contain a reduced content of microscale filler, or even no microscale filler. For example, various embodiments of the teachings herein may comprise an electrical winding for a dry transformer with a winding conductor, especially a high-voltage winding for voltage ranges up to 36 kV, wound in multiple windings to form a coil, said coil having been embedded in a solid insulation body, characterized in that a coating having a particular sheet resistance has been provided on at least one surface of the insulation body, the coating is producible by application of a formulation and comprises a resin component and at least one nanoscale and electrically conductive filler, where the nanoscale filler is present in a particle size of less than 500 nm.

In some embodiments, nanoscale filler is present in the coating in an amount of less than 20% by weight and/or less than 10% by volume.

In some embodiments, the coating completely covers the surface of the insulation body.

In some embodiments, the coating is composed of semiconductive material.

In some embodiments, the coating has at least bimodal filling, i.e. at least two filler particle fractions are present in the coating.

In some embodiments, the surface resistance of the coating is $10^2$ Ω/□ to $10^5$ Ω/□, preferably $10^3$ Ω/□ to $10^4$ Ω/□.

In some embodiments, the formulation is applicable by a spraying method for production of the coating.

In some embodiments, the formulation comprises water as solvent.

In some embodiments, the coating has been grounded.

In some embodiments, the defined sheet resistance of the coating is adjustable via the setting of the ratio of at least two filler particle fractions in the formulation.

In some embodiments, the thickness of the coating is in the range from 1 μm to 5 mm.

As another example, some embodiments may include a process for producing an electrical winding, comprising the process steps of: winding a winding conductor in multiple windings to form a coil, embedding the coil into a solid insulation body, preferably by potting with a casting resin and subsequent curing of the insulation body, producing a formulation for production of a coating with a predetermined sheet resistance, and applying the formulation for production of the coating to at least one surface of the insulation body.

In some embodiments, the coating is applied to the entire surface of the insulation body.

In some embodiments, the coating is composed of a semiconductive material.

In some embodiments, the coating is produced by spray application of a formulation and subsequent curing.

In some embodiments, the formulation is applied by painting, spraying, coating, rolling and/or in the form of a dip-coating.

In some embodiments, the formulation is applied as a water-based solution.

BRIEF DESCRIPTION OF THE DRAWINGS

The teachings herein are elucidated in detail hereinafter with reference to a FIGURE:

FIG. 1 is a graph showing the aging of an example semiconductor coating within 150 days at 170° C. After solidification of the coating within the first few days, stable retention of the defined sheet resistance in spite of the storage at 170° C. is apparent over the entire period under consideration that amounts to half a year.

DETAILED DESCRIPTION

Various embodiments of the present teaching may include an electrical winding for a dry transformer in compact design and a process for producing a coating for an insulation body of such an electrical winding of a dry transformer in compact design, wherein the coating is provided at least on a surface of the insulation body having a sheet resistance in the range from $10^2$ to $10^5$ ohms/square and exhibiting high thermal stability, high mechanical robustness and resistance to environmental effects such as moisture and insolation.

In some embodiments, an electrical winding, especially a high-voltage winding, for a dry transformer includes a winding conductor wound in multiple windings to form a coil, wherein the coil has been embedded into a solid insulation body, wherein at least one surface of the insulation body has a coating having a particular sheet resistance which comprises a resin component and at least one nanoscale and electrically conductive filler, wherein electrically conductive filler is present in a particle size of less than 500 nm in at least one dimension.

The winding conductor may be a film conductor, a tape conductor, and/or a wire conductor. The coil has been embedded into an insulation body composed of a solid insulation material. Frequently, a casting resin is used for this purpose, with which the coil is potted and which is cured after the potting. As a result, a mechanically stable winding is obtained in the form of a hollow cylinder, the coil of which has good protection from environmental influences. In some embodiments, a coating composed of a resin mixture having a nanoscale filler content below 20% by weight and/or below 10% by volume has been applied to at least one surface of the insulation body.

Some embodiments may include a process for producing an electrical winding, comprising the process steps of:
  winding a winding conductor in multiple windings to form a coil,
  embedding the coil into a solid insulation body, preferably by potting with a casting resin and subsequent curing of the insulation body,
  setting a predetermined sheet resistance in a formulation for production of a coating by incorporating at least one nanoscale filler fraction of electrically conductive filler particles into an unhardened resin, and
  applying the formulation for production of the coating to at least one surface of the insulation body.

In some embodiments, the filler comprises a nanoscale filler fraction, the filler content of which accounts for less than 20% by weight and/or less than 10% by volume of the coating. In some embodiments, there are at least two filler particle fractions in the coating.

In some embodiments, a defined sheet resistance is determinable via the amount and/or the material in which at least one nanoscale filler fraction is present in the coating.

In some embodiments, the defined sheet resistance may also be determinable via the ratio of two nanoscale filler fractions that are present in the coating. In some embodiments, a nanoscale filler fraction is present in combination with a microscale filler fraction.

In some embodiments, the coating is producible by application of a formulation. This involves applying a processible, e.g. free-flowing, mixture of an uncured resin component with a hardener, either in the form of two separate components or present in one component, to a surface with added filler and in solution. Subsequently, this formulation is cured on the surface, for example by thermal and/or UV-initiated reaction, to give the finished coating.

In some embodiments, the resin matrix takes the form of a 2-component system composed of resin and hardener. A water-soluble 2-component system avoids organic solvents in the production of the coating, which are generally regarded as hazardous to the environment. It is possible here to process hardener component and/or resin component in aqueous solution.

In some embodiments, a one- or two-component resin system which is environmentally compatible, especially through the use of water-based solvents, is used. For example, through the use of an aqueous polyurethane acrylate resin system, it is possible to realize far-reaching ecological aspects such as dispensing with recycling or postcombustion of the solvent. At the same time, another factor is facilitation of occupational protection for the operator and/or manufacturer, for example a painting operative. Therefore, production of the formulation which is applied for production of the coating on at least one surface of the insulation body, water-based solvents are sufficient.

A material is considered to be electrically conductive when the electrical resistance is less than $10^8$ $\Omega/\square$. Above that, a material is considered to be an insulator or nonconductive. The coating may have been applied at least on the inner shell face of the insulation body, and/or on the end faces. In some embodiments, the coating has been applied over the entire surface of the insulation body, i.e. not only on the inner shell face and the end faces but also on the outer shell face. Such a coating substantially degrades the electrical field of the electrical winding within the casting resin and thus reduces it outside the winding to a size that allows the separation from other constituents of the transformer, such as core or low-voltage winding, to be reduced, which enables a more compact design.

In some embodiments, the coating is composed of a semiconductor material. A semiconductor material is considered to be one having a specific resistance of less than $10^8$ $\Omega/\square$ and greater than $10^1$ $\Omega/\square$. Since an electrically conductive coating, especially one of the entire surface, of a winding constitutes a short-circuit winding, a current that generates a power loss will flow therein. A coating composed of a semiconductor material can limit this power loss. In some embodiments, the conductive or semiconductive coatings are based on a resin system into which a nanoscale semiconductive filler has been incorporated, e.g. in an amount of less than 20% by weight and/or less than 10% by volume.

In some embodiments, a two-component resin system comprises a first component selected from the group of the following resins: epoxy resin, polyurethane resin, acrylate resin, polyimide resin and/or polyester resin system, and any desired mixtures, copolymers and blends of the aforementioned resins. The second component added to the formulation is, for example, a hardener matched to the particular resin, such as amine, acid anhydride, peroxide, polyisocyanate, and/or aliphatic polyisocyanate. A water-soluble hardener component offers environmental compatibility, because this dispenses with the postcombustion of the solvent and, in general terms, the use of organic solvents is ecologically disadvantageous for the purposes of sustainability.

The formulation has a certain processing time in which it is applied as an uncrosslinked formulation for coating to at least one surface of the insulation body. The application is effected, for example, by spraying, painting, rolling and/or by dipping. After curing, the formulation crosslinks and attains stability to environmental influences, insolation, mechanical stresses etc. The crosslinking is assisted, for example, by heating.

In some embodiments, the coating has stability at temperatures up to 170° C.

In order to attain a defined electrical conductivity, a nanoscale filler is added to the formulation. This nanoscale filler may be present in the formulation in an amount of less than 20% by weight, less than 15% by weight, or less than 10% by weight of the dry mass of the formulation or, in a corresponding percentage by volume, less than 10% by volume.

In some embodiments, the filler comprises a nanoscale filler having, at least in one dimension, a length of less than 500 nm, less than 200 nm, or less than 100 nm. The filler may comprise all kinds of filler particle forms. For example, it is possible for globular fillers to be present mixed with fillers in platelet form. In the case of very lightweight filler particles present in combination or alone in the formulation, the limit of less than 20% by weight is replaced by the corresponding percentage by volume; in other words, for example, about 10% by volume is assumed to be the upper limit.

The filler particles may comprise semiconductive material. For example, the material may be graphite, metal oxide, and/or metal nitride, and any mixtures thereof. In particular, semiconductor nanoparticles such as carbon nanotubes, carbon fibers, and/or graphenes are also useful. In some embodiments, multiwall carbon nanotubes are used.

The nanoparticles make it possible for the filler level of semiconductive filler particles in the resin, in the case of establishment of an electrical resistance in the range from $10^3 \Omega/\square$ to $10^4 \Omega/\square$, to be reducible to amounts of less than 10% by weight. The filler particles may also be hollow; in particular, hollow fibers and/or hollow spheres are also usable alone or in combination with other filler particle fractions.

In some embodiments, the semiconductive coatings may comprise metals, metal oxides, and/or doped metal oxides. Semiconductive hollow spheres, hollow fibers, and/or shells may also be used as filler particles. The upper limit for these very lightweight filler particles is then a filler level of about 10 percent by volume in the coating. The nanoparticulate fillers may be used in multimodal combination, e.g. in various filler particle sizes and/or filler particle forms.

In some embodiments, the thickness of the coating is, for example, in the range from 1 μm to 5 mm, from 30 μm to 500 μm, or in the range from 70 μm to 130 μm.

By suitable selection of material for the filler particles, filler particle size, filler particle form, filler particle structure, grain size distribution, size of the specific surface area, and/or surface activity of the filler, it is possible to produce a widely diversified profile of properties in the coating. In some embodiments, the proportion of nanoscale filler in the coating is in the region of less than 20% by weight, but this nanoscale filler of particle size less than 500 nm in at least one dimension may also be supplemented, for example, with microscale filler of size at least 1 μm. In this case, the content of microscale filler in the filler mixture is as desired. For example, less than 50% by weight or a corresponding volume percentage in the case of lightweight and microscale filler particles such as hollow particles is combined with nanoscale filler in the formulation.

In some embodiments, the coating has a specific area resistance, also called sheet resistance, of $10^2$ $\Omega/\square$ to $10^5$ $\Omega/\square$, preferably $10^3$ $\Omega/\square$ to $10^4$ $\Omega/\square$. This area resistance is possessed by the electrical winding in the new state. This can change as a result of aging, environmental effects, or soiling. An area resistance of this order of magnitude on the one hand limits the power loss, but on the other hand still gives enough latitude in the event of reduction of the area resistance by soiling.

In some embodiments, the coating has been applied by brush application and/or a spraying method. Application by spraying firstly ensures a homogeneous layer thickness and secondly prevents inclusions of air that would lead to partial discharges.

In some embodiments, the coating is electrically grounded. This reduces the electrical field outside the winding.

In some embodiments, the coating may be applied to the entire surface or only to parts of the surface of the insulation body, as already described. The insulation body is composed of an epoxy resin, for example, with a particular surface roughness of the insulation body on the sides to be coated may improve the adhesion of the coating on the surface.

In some embodiments, so that a homogeneous distribution of the filler particles is optimized, a dispersing additive, for example a surfactant and/or an ionic-based additive may be added to the formulation.

By such a process, it is possible to produce an electrical winding, the electrical field of which is largely shielded by the coating, and which, used in a dry transformer, thus enables a more compact design. The coating may comprise a paint. The coating may be applied here by spraying, painting, rolling, and/or in the form of a dip-coating. It is possible here for two or more of the processes mentioned to be used successively or simultaneously for application of the formulation.

In some embodiments, the surface of the insulation body is treated prior to the application of the formulation, so as to ensure good adhesion of the formulation and subsequently of the coating on the insulation body. In some embodiments, the coating comprises a semiconductive material. In some embodiments, the coating has been applied in a spraying process, by means of which it is possible to achieve a particularly homogeneous layer thickness.

There follows a detailed elucidation of the production of an illustrative formulation for production of a coating in one embodiment of the invention in the form of a tabular summary:

| | |
|---|---|
| Resin component, for example acrylate or polyurethane or a polyurethane-acrylate mixture | 100 g |
| Hardener component, for example isocyanate or polyisocyanate | 36.69 g |
| Nanoscale filler, for example CNTs | 9.77 g |

The example shown specifies a formulation comprising nanoscale filler for a paint coating of a dry transformer in compact design, wherein the combination of environmentally compatible paint technology, by virtue of water-based hardener components and the robustness nevertheless achieved from a mechanical and thermal point of view, as demonstrated in FIG. 1, demonstrates the technical innovation of the formulation shown here, especially in the case of use for dry transformers.

What is claimed is:
1. An electrical winding for a dry transformer with a winding conductor, the winding comprising:
   multiple windings wound to form a coil;

a solid insulation body with the coil embedded therein; and a coating on at least one surface of the insulation body;

wherein the coating comprises a resin component and a nanoscale, electrically conductive filler, the nanoscale filler comprising carbon nanotubes having a particle size of less than 500 nm;

wherein the coating comprises no microscale filler with a particle size above 500 nm;

wherein the nanoscale filler makes up less than 20% by weight and/or 10% by volume of the coating; and wherein the coating has a sheet resistance defined by the particle size and a filling fraction of the nanoscale filler in the range from $10^2$ Ω/□ to $10^5$ Ω/□.

2. The electrical winding as claimed in claim 1, wherein the coating completely covers the surface of the insulation body.

3. The electrical winding as claimed in claim 1, wherein the coating comprises semiconductive material.

4. The electrical winding as claimed in claim 1, wherein the coating comprises bimodal filling with at least two filler particle fractions present.

5. The electrical winding as claimed in claim 1, wherein the coating is applied by a spraying method.

6. The electrical winding as claimed in claim 1, wherein a formulation for the coating comprises water as solvent.

7. The electrical winding as claimed in claim 1, wherein the coating is grounded.

8. The electrical winding as claimed in claim 1, wherein a defined sheet resistance of the coating is adjustable via the setting of the ratio of at least two filler particle fractions in the formulation.

9. The electrical winding as claimed in claim 1, wherein a thickness of the coating is in the range from 1 μm to 5 mm.

* * * * *